Jan. 28, 1958     G. PIGEON     2,821,188
APPARATUS FOR THE MEASUREMENT OF ARTERIAL PRESSURE
Filed April 26, 1954     6 Sheets-Sheet 1
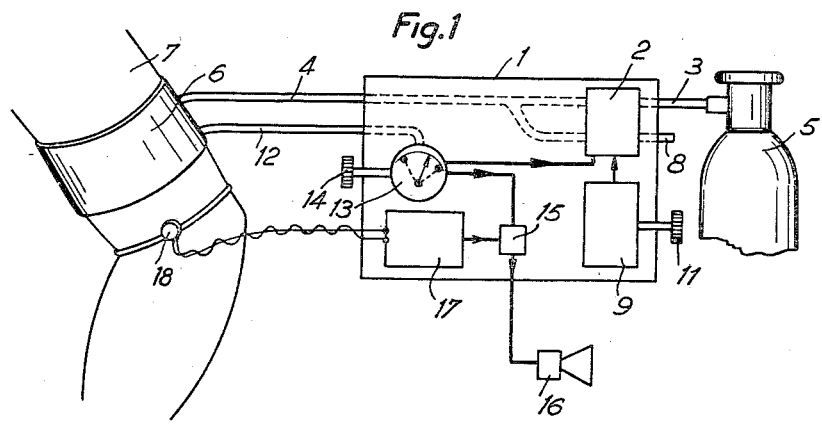
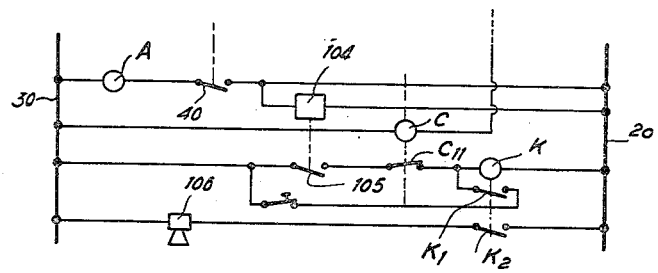
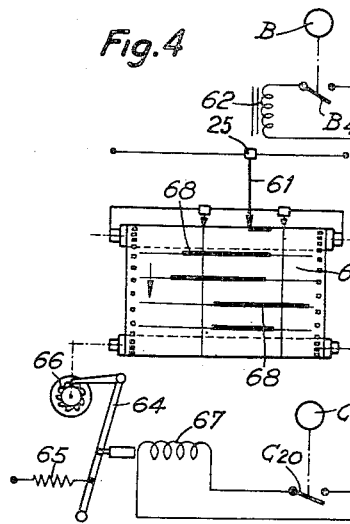
INVENTOR
GERARD PIGEON

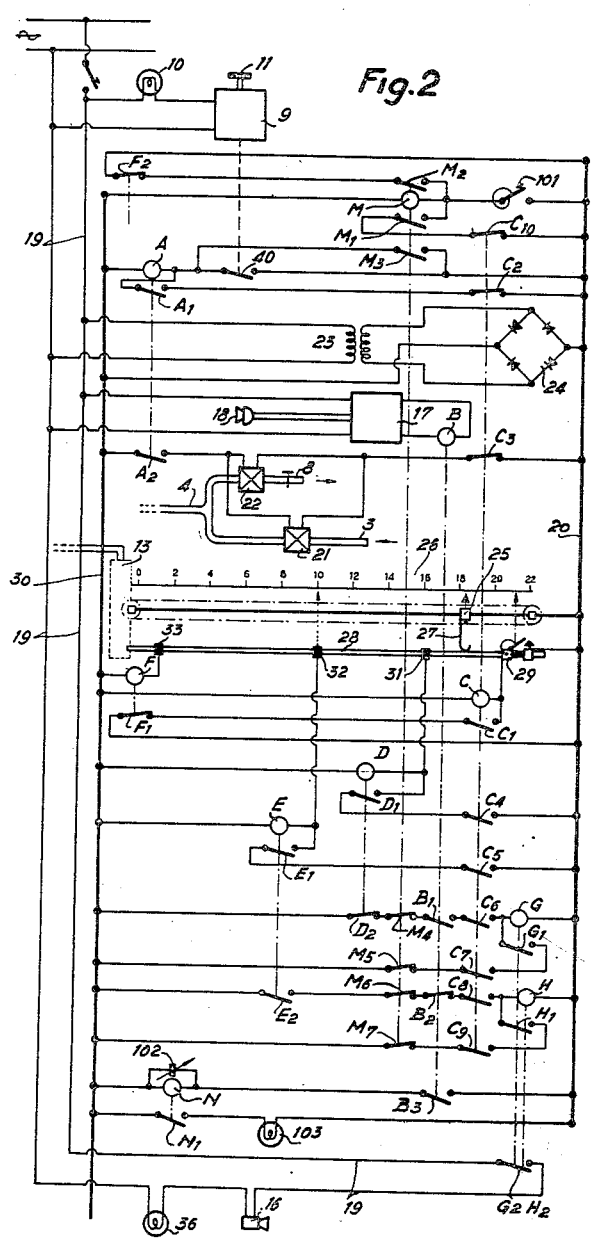

Jan. 28, 1958 G. PIGEON 2,821,188
APPARATUS FOR THE MEASUREMENT OF ARTERIAL PRESSURE
Filed April 26, 1954 6 Sheets-Sheet 4

INVENTION
GERARD PIGEON
By: Young, Emery & Thompson
ATYS.

Jan. 28, 1958   G. PIGEON   2,821,188
APPARATUS FOR THE MEASUREMENT OF ARTERIAL PRESSURE
Filed April 26, 1954   6 Sheets-Sheet 5

INVENTOR
GERARD PIGEON
By: Young, Emery & Thompson
ATTYS.

United States Patent Office 2,821,188
Patented Jan. 28, 1958

2,821,188
APPARATUS FOR THE MEASUREMENT OF ARTERIAL PRESSURE

Gerard Pigeon, Paris, France

Application April 26, 1954, Serial No. 425,496
Claims priority, application France May 7, 1953
13 Claims. (Cl. 128—2.05)

Apparatus generally used for measuring the arterial pressure and called sphygmomanometers are known to consist of an armband provided inside with an expandable pocket acting as a garrot, connected, on the one hand with a bulb or pump and on the other hand with a pressure gauge. The measurement of the arterial pressure consists in increasing the pressure in the pocket so as to block the blood flux in the humeral artery. At the same time a stethoscope is applied on this same artery below the armband. The pressure inside the pocket is then allowed to decrease and at the time when a pulse is heard in the stethoscope, the pressure read on the manometer or pressure gauge is noted, said pressure corresponding to the arterial pressure.

Under these conditions, it is possible, for every individual, to define two critical values of the pressure: that corresponding to the pressure which should not be exceeded (maximum acceptable pressure) and that corresponding to the necessary minimum. If the first audible signal when measuring the pressure corresponds to pressures located outside these two limits, the patient is in a dangerous condition and should be attended to. Consequently for patients and people just operated on, measurements of the pressure are made at regular intervals, the frequency of which is all the greater as the condition of the patient is more critical. Care is thus taken to keep arterial pressure constantly between the acceptable maximum and the necessary minimum.

In the case of hospitals and surgeries, these frequent measurements of pressure are heavy servitude as they require the intervention of a numerous skilled and alert staff.

The present invention concerns a method and adjustable apparatus making it possible to ensure automatically a checking of the arterial pressure at regular intervals.

The method according to the invention consists in causing, automatically, at predetermined time intervals, the following sequence of operations; the placing under pressure of a sphygmomanometric armband, then a slow decompression of said armband, detection and eventual amplification of the audible signal heard at the level of the artery and a simultaneous detection of the corresponding pressure, a comparison of this pressure with the accepted limiting values, and the releasing of an alarm signal when the pressure thus detected is outside these limits.

The invention further comprises an apparatus for applying the above mentioned method, said apparatus comprising a set of valves which ensure the communication between a sphygmomanometric armband on the one hand, a source of fluid under pressure or the outside atmosphere on the other hand, a device for the automatic control of these valves at a predetermined frequency, preferably adjustable, a pressure gauge connected with the above mentioned armband, an electronic amplifier connected with a microphone placed over an artery of the patient, beyond the armband, the pressure gauge and amplifier acting jointly on relays controlling an alarm circuit. Other features of the invention will further appear from the description which follows:

In the appended drawings, there are represented by way of non limitative examples, various forms of embodiment of the invention.

Figure 1 is a diagrammatic view of the various components of an apparatus.

Fig. 2 is a schematic wiring diagram of a particular embodiment of the invention.

Fig. 3 is a complementary diagram of Fig. 2 and relating to an auxiliary safety device.

Fig. 4 is a complementary diagram to Fig. 2 and relating to a recording device.

Figure 5:
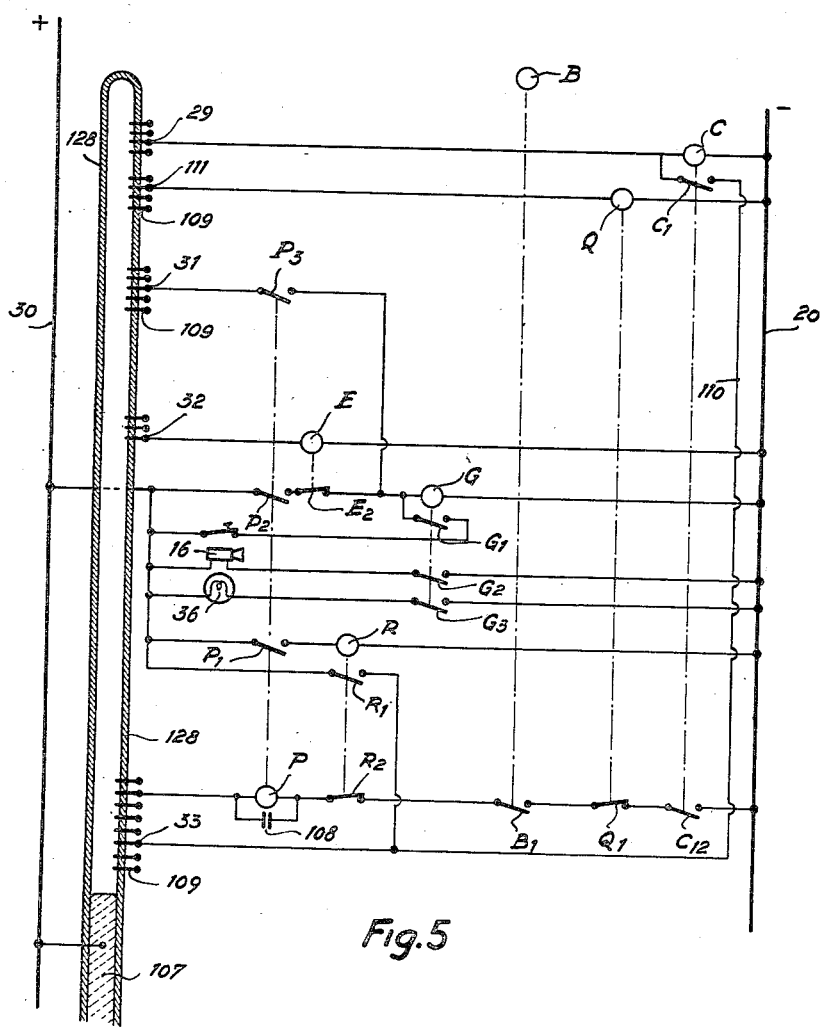
Fig. 5 is a partial diagram of the connections in another embodiment of the invention, the upper part of said diagram being the same as the part of Fig. 2 above the pressure scale.

Referring to Figure 1, it will be seen that an apparatus according to the invention consists of a box 1 containing a group of valves 2 ensuring through pipes 3 and 4 a communication between a compressed gas bottle 5 and a sphygmomanometric armband 6 placed on the arm 7 of a patient. The valves 2 also allow the communication between the armband 6 and the outside atmosphere by means of the pipe 8.

These valves are controlled automatically by a timing device 9, mechanical or electrical, which acts at predetermined time intervals, the periodicity being adjustable by means of the button 11.

The armband 6, in addition, is placed in communication through the pipe 12 with a manometric system 13 on which a button 14 makes it possible to post, in function of the nature of the patient, the two critical values of the arterial pressure: the acceptable maximum pressure and the necessary minimum pressure. This pressure gauge comprises further means making it possible to detect the value of the instantaneous pressure obtaining in the armband, and to compare this value with the two critical values, and elements capable of generating, as a consequence of this comparison, characteristic control signals acting on an assembly of relays schematized at 15 and arranged in an alarm circuit comprising, for instance, a hooter 16. In addition, a other elements may be provided for acting on the assembly of the valves 2 so as to limit to its maximum acceptable pressure, the inflation pressure for the armband 6.

The box 1 also contains a very low frequency and high sensitivity amplifier 17 connected with a microphone 18 adjusted on the patient's arm at the level of the humeral artery. The output current from the amplifier 17 also operates the relays 15.

The apparatus operates as follows:

At a given instant, under the control of the timer 9, the valve placed on the pipe 3 opens while that placed on 8 closes, the compressed gas issuing from 5 then inflates the armband 6 up to a predetermined pressure value. When this value is reached, the pressure gauge 13 causes the inverse action of the valves 2 and the armband 6 is slowly deflated through 8. As long as the pressure is higher than the acceptable maximum or when it becomes lower than the necessary minimum, the relays 15 controlled by 13 ensure the closing of the portion of the alarm circuit they control. If the audible signal occurs under such conditions, the amplifier 17 causes the energizing of the group of relays 15 placed under its control. The alarm circuit is then entirely closed and the hooter 18 operates.

If, on the contrary, the audible signal occurs in the zone of accepted pressures, a portion of the relays 15 is out of service and no alarm is given.

The particular form of embodiment described in Figure 2 concerns the case of an entirely electrical apparatus, utilizing paddle type relays and energized from the mains through the conductors 19. In this embodiment, the timer device 9 is constituted by a delayed contactor with automatic repriming of a conventional type, on the power supply circuit of which a pilot lamp 10 is placed.

On the conductors 19 are also mounted, in parallel, on the one hand a transformer 23 which feeds into a rectifier bridge 24, the output terminals of which are connected with the conductors 20 and 30 ensuring the low voltage D. C. power supply for the apparatus and, on the other hand the amplifier 17 on the output circuit of which is inserted a relay B.

The contactor 9 controls a contact 40 placed on the energizing circuit for an auxiliary relay A which controls a self-excitation contact $A_1$ and a contact $A_2$ on the power supply circuit of two opposing electro-valves 21 and 22 connected in parallel, 21 being a high pressure valve, normally closed, 22 a low pressure valve, normally open.

There will be recognized in 13 the manometric device in which the sensitive element actuates a slide 25 connected electrically with 20. This slide moves in front of a board 26 calibrated in pressures and comprises a wiper-contactor 27 which glides on an insulating straight edge 28 provided with an end of run conductor 29, two movable contact points 31 and 32 and a fixed contact point 33.

The contactor 29, normally open, may be closed by 27 when the pressure reaches the maximum value accepted for the inflating of the armband (for instance 21 cms. of mercury).

The contacts 31 and 32 indicate respectively the maximum acceptable pressure (16 cms. of mercury) and the necessary minimum pressure (10 cms. of mercury).

The contact 33 corresponds to a very low value of the pressure (1 cm. of mercury).

The contactor 29 and the contact 31, 32, 33 are placed respectively on the power supply circuit of a priming relay C, of a maximum type relay D, of a minimum type relay E, of an end-of-run relay F, provided respectively with self-excitation contacts $C_1$, $D_1$, $E_1$, $F_1$, the contacts $C_1$ and $F_1$ being connected in series.

In addition, the relay C actuates the contact $C_2$, normally closed, on the self-excitation circuit of A; the contact $C_3$ normally closed on the circuit of the electro-valves, the contacts $C_4$ and $C_5$ on the self excitation circuits of D and E, the contacts $C_6$, $C_7$, $C_8$ and $C_9$ respectively on the excitation and self-excitation circuits of the two alarm relays G and H. These are provided with self excitation contacts $G_1$ and $H_1$ and actuate, in parallel a contact $G_2H_2$ placed on the alarm circuit power supplied by 19 and comprising, for example, a hooter 16 and a light indicator 36.

The relays D and E control the contacts $D_2$ and $E_2$ placed, the first one on the energizing circuit of the alarm relay G and the second one on the similar circuit for the relay H.

Finally, the relay B acts on the contacts $B_1$ in series with $D_2$ and $C_6$ and $B_2$ normally closed, in series with $E_2$ and $C_8$.

The apparatus thus described still comprises two auxiliary devices. The first one makes it possible to obtain a manual checking of the blood pressure with a momentary placing out of commission of the alarm device, the second one allowing a visual or sound materialization of the duration of the audible signals collected in the microphone placed on the artery of the patient during the deflating of the armband.

The first one of these devices comprises a relay M controlled by a spring type manual contactor 101 and provided with two self energizing contacts: $M_1$ on a circuit comprising the contact $C_{10}$ (with a delayed closure) normally closed and controlled by the priming relay C; $M_2$ on a circuit comprising the contact $F_2$, normally closed controlled by the end-of-run F. The relay M also controls a contact $M_3$ catering to the relay A and mounted in parallel with the contact 40 controlled by the timer 9 and the contacts $M_4$, $M_5$, $M_6$ and $M_7$ on the energizing or self-energizing circuits for the alarm relays G and H.

The second device comprises a relay N, delayed by an adjustable condenser 102 to a value larger than the time interval separating two pulses. The relay is controlled by the contact $B_3$ connected with the relay B and itself controls the closure of the contact $N_1$ on a circuit which comprises a signal such as an incandescent lamp 103.

The operation is as follows: the conductors 19 being energized by the closing of the corresponding manual switch, the delayed contactor 9 ensures at a predetermined instant the closing of 40, which causes the energizing of A, the closing of $A_1$, $A_2$ and the consequent energizing of the electro-valves, resulting in the closing of 22, the opening of 21 and the inflating of the armband.

The slide 25 then moves towards the right in correlation with the rising of the pressure. When the latter reaches the maximum value, 27 closes 29, which causes the excitation of C.

There results from the opening of $C_2$ and $C_3$ the de-energizing of A and of the electro-valves, which ensures the deflating of the armband. At the same time the self energizing circuits of D, E, G, H, are primed. The same thing holds for the energizing circuits of G except for contact $B_1$ and of H except for the contact $E_2$.

The following operating possibilities are then considered:

(1) Arterial pressure higher than the acceptable maximum. The audible signal occurs while the wiper 27 is upstream with respect to 31. The energizing of B causes the closing of $B_1$, the energizing of G, the consequent closing of $G_1$ and $G_2H_2$. As a result, the alarm devices operate and the contact of $G_2H_2$ remains closed, owing to $G_1$, independently of the pressure drop in the armband, until some action is exerted on the manual power supply switch placed on 19.

(2) A normal arterial pressure. The slide 27 clears the contact point 31, which causes the energizing of D and the opening of $D_2$; G is put out of service. Since H is itself out of service because of $E_2$, the alarm signals are put out of service.

In all cases, the audible signals are heard during several pulses, but the relay B is retarded in such a manner that once it is energized, its contacts $B_1$ and $B_2$ remain respectively closed and open for a time definitely longer than that of the audible impulse. The result is that these contacts cannot beat at the frequency of the pulse. Under such conditions, when 27 passes over 32 and excites E, $E_2$ closes but $B_2$ being open H cannot be excited. No alarm is given.

(3) Material pressure lower than the necessary minimum. When 27 passes over 32 the excitation of E causes the closing of $E_2$ and since $B_2$ is closed since no signal has yet been heard, H is excited, the alarm is given.

In all cases, when 27 passes over 33, $F_1$ opens and C is de-energized which ensures the placing out of circuit of D, E, G, H, unless one of the two latter relays has already been excited, in which case it remains so. The relay F thus acts as a de-priming relay.

In practice, for determining the limiting values (acceptable maximum and necessary minimum) for a given patient, the operator begins by closing the spring contactor 101, which energizes M and closes the contact $M_3$ causing the same effect as the closing of the contact 40; putting in action of the valves 21 and 22, inflating then deflating of the armband. During the rising of the contactor 25 M remains energized owing to $M_1$. After $C_{10}$ has opened, M remains energized owing to $M_2$. The contacts $M_4$ to $M_7$ being open, the alarm circuits are placed out of service. At the first audible impulse, the relay B is energized, closes the contact $B_3$, which energizes the relay N which closes $N_1$ for the whole duration of the audible pulses, owing to the delay 102. The lamp 103 therefore, remains lit. The operator, by observing the values of the pressure indicated by the pressure gauge during the period in which the lamp 103 is lit, can thus know the pressures at which the audible signals are generated and adjust in consequence the contacts 31 and 32 according to the condition of the patient. The delay in the closing of the contact $C_{10}$ makes it possible to ensure the certain de-energizing of M when $F_2$ closes.

In Figure 1, is shown a safety device which can be added advantageously to the above apparatus for actuating an alarm in case the priming relay C does not operate for any reason whatsoever.

This device comprises a timer 104, in series with the contact 40 and an auxiliary alarm relay K placed in a circuit which contains a contact $C_{11}$, normally closed, actuated by C and a contact 105 normally open, controlled by 104.

The relay K also controls the self energizing contact $K_1$, the relay $K_2$ in the circuit of an alarm device 106.

Under such conditions, when the contact 40 is closed, the timer 104 starts operating and, after a predetermined time interval, closes 105. If then $C_{11}$ has remained closed, which indicates that C did not operate, the relay K releases the alarm 106. Of course this alarm is a special type so as not to be mistaken for that concerning the condition of the patient.

For medical uses, it may be interesting to automatically record the range of pressures at which the audible signal occurs, as the ends of this range make it possible to determine the maximum and minimum values of the blood pressure.

Such a recording device is shown in Figure 4, wherein the slide 25 of the pressure gauge controls a writing pen 61 which is held in contact with the recording paper 63 as long as the relay B is energized, through the electromagnet 62 and the additional contact $B_4$. The advance of the paper is obtained as follows: the lower driving roller is associated with a ratchet wheel 66 on which is engaged an articulated lever 64 connected with a return spring 65 and the core of an electromagnet for attraction, 67, the energizing of which depends on the contact $C_{20}$ controlled by C. Due to this fact, when $C_{20}$ opens, the spring 65 recalls the lever 64 which causes the rotation of 66 and the advance of the paper 63. After each cycle, the paper is thus offset by a certain distance. After recording, successive, lines 68 are thus obtained, with different positions and indicating the pressures at which the audible signals occur.

The device of Figure 5 concerns the case in which the manometric element adopted is of the type having a mercury column 107. This column which is placed under a voltage by the general power supply conductor 30 is contained in an envelope 128, made of glass for instance, and which comprises through contacts regularly spaced, 109 used for defining stepped values of the voltage.

In this embodiment, one of the upper contacts 109 (the contact 29) is connected with the priming relay C which controls a self energizing contact $C_1$ connected through the conductor 110 with the end-of-run contact 33.

The relay C also controls a contact $C_{12}$ placed on the circuit of an auxiliary relay P delayed by the capacity 108.

The circuit of P also comprises the contact $Q_1$ controlled by a relay Q connected with a contact 111 located between the contacts 29 and 31, and the contact $R_2$ actuated by a second auxiliary relay R, the energizing of which is precisely dependent on a contact $P_1$ controlled by P. The latter further controls a contact $P_2$ in series on the circuit of the alarm relay G with a contact $E_2$ and a contact $P_3$ on a conductor connected between the contact 31 for the maximum voltage and the alarm relay G.

The operation of the device is easily understood: when the timer 9 closes the contact 40 (Figure 2), the mercury column 107 rises inside the tube. When it reaches 29, C is excited and closes $C_{12}$. Since Q is also energized and holds $Q_1$ open, the relay P cannot be excited even should $B_1$ close. The result is that the range of active observation begins only from the moment when the column 107 has dropped below 111, i. e. when the eventual oscillations of the mercury due to the operation of the valves 21 and 22 have ceased.

The column 107 being between 111 and 31 (accepted maximum), if $B_1$ closes, P is energized, and closes $P_1$; this energizes R and opens $R_2$. R remaining energized owing to $R_1$, P is insensitive to the beats of $B_1$; the first audible impulse thus acts alone. Since P is delayed by 108, the closing of $P_3$ occurs for a sufficient duration for G to be energized and to remain so owing to $G_1$; which releases the alarm.

If the column 107 has dropped below 31 without $B_1$ closing, G can no longer be energized by P, since $E_2$ remains open. If the column, however, has dropped below 32, the closing of $B_1$ again causes the alarm. When the column drops below 33, C is de-energized and the cycle may start again.

Figure 6:
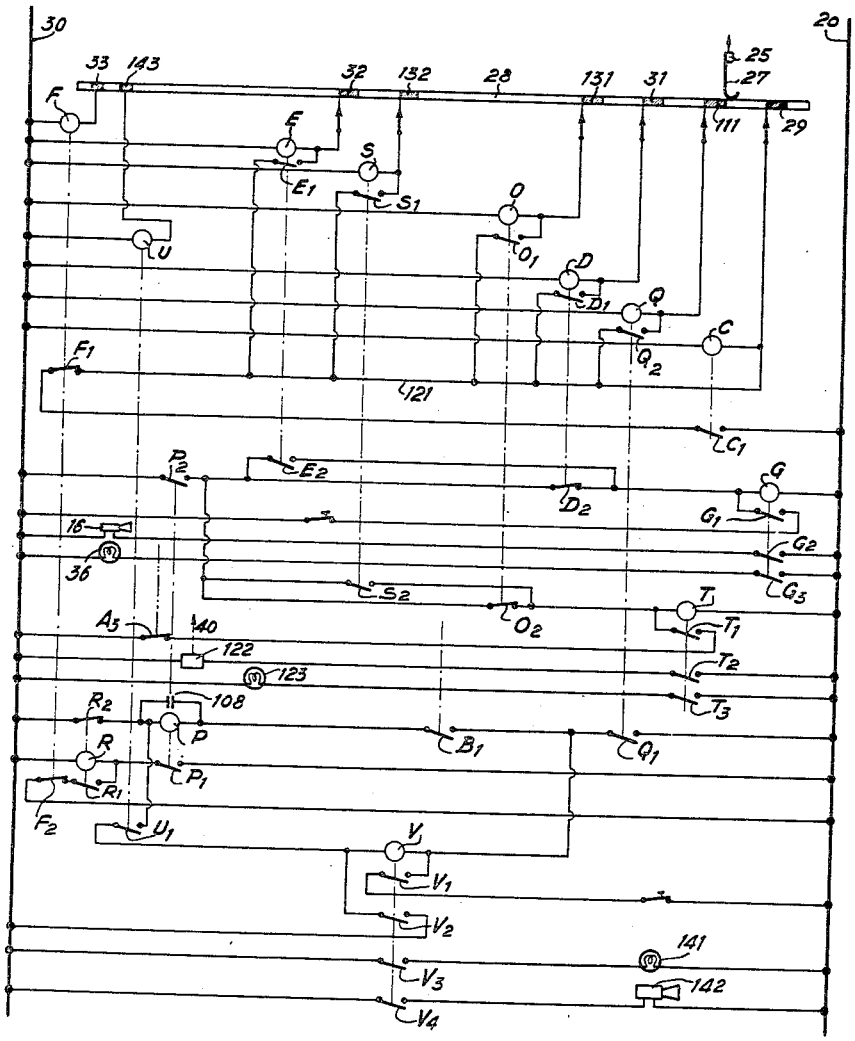
Fig. 6 is a partial diagram of an improved relay type apparatus, the upper part of said diagram being the same as the part of Fig. 2 above the track 28.

The apparatus of Figure 6 which as that of Figure 2 comprises a movable manometric element constituted by a slide 25, offers the same improvements as the apparatus in Figure 5 (start of the supervision delayed, utilizing the first pulse alone). To this effect, the relays Q, P and R are again found, suitably arranged as in the case of Figure 3.

The apparatus considered is further provided with devices which ensure, automatically:

(1) An acceleration in the rhythm of supervision, if the pressure measured is outside the alarm zones but in the vicinity of the limits set (which generally results in a worse condition of the patient).

(2) The releasing of the alarm if the contact $B_1$ has not operated during the deflating (which may be caused either by a failure of the equipment or by an absence of blood circulation in the patient).

For realising the first one of these improvements, there are added to the relays D and E the relays O and S which lead to contacts 131 and 132 located inside the acceptable zone, and in the vicinity of the contacts 31 and 32. All the relays C, Q, D, O, S, E are provided with self energizing contacts $C_1$, $Q_2$, $D_1$, $O_1$, $S_1$, $E_1$ connected with the conductor 121, controlled by $F_1$ and $C_1$ which prevents the self energizing of the relays other than C as long as the pressure is rising. A timer 122 is also provided giving impulses at a frequent rhythm (every five minutes for instance) and a warning light signal 123, controlled by the contacts $T_2$ and $T_3$ of relay T, the energizing of which is under the control of $P_2$ (i. e. of $B_1$) and of the opposing contacts $O_2$ and $S_2$. The self excitation contact $T_1$ of T is further controlled by a contact $A_3$ actuated by A.

Under these conditions, if $B_1$ closes when 25 is between 31 and 131, $O_2$ being closed as well as $P_2$, T is energized, which starts 122. The new measurement will thus take place five minutes later, but the putting in operation of 122 will cause the opening of $A_3$, which will thus place 122 out of service for the benefit of 9.

The device which operates the releasing of an alarm 141, 142 in case of a non closing of the contact $B_1$ during decompression, is constituted by a relay U leading to a contact 143 in the vicinity of 33 and which controls a contact U₁ on the circuit of a relay V, in parallel with B₁. The relay V is provided with self excitation contacts V₁, V₂ and actuates the contacts V₃ and V₄ which release the alarm.

Figure 7:
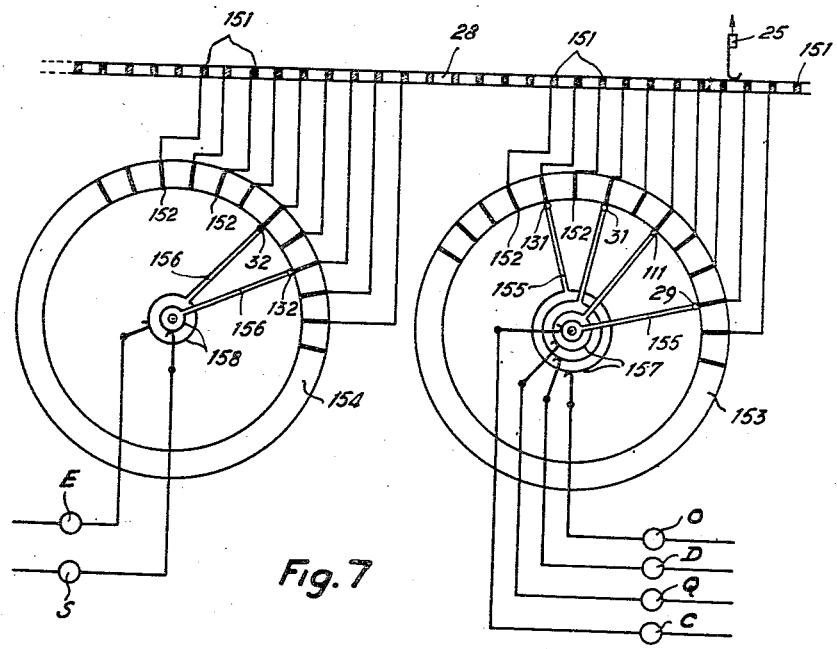
Fig. 7 is a diagrammatic view of rotary switches to be substituted to the adjustable contacts of Fig. 6.

Figure 7 shows a particular form of embodiment of the connections between the relays O, D, Q, C, on the one hand, E, S on the other hand, and the strip 28 over which the contactor 25 rides. In this embodiment, the strip is made of insulating material and comprises contacts 151 regularly spaced, each one of them connected to a corresponding contact 152 of switches with sections 153 and 154. Each one of these switches comprises a central pivot on which are secured conducting arms 155 and 156 terminated by contactors, and the angular spacing of which reproduces that of the contacts 29, 111, 31, 131 on the one hand, 132 and 32 on the other hand. Each one of the arms 155 and 156 caters, through the medium of a ring device 157 and 158 the relays C, Q, D, O on the one hand and S, E, on the other hand. It will thus be realized that it is possible, by two control operations only to select the values of the various pressures corresponding to the patient's condition.

Figure 8:
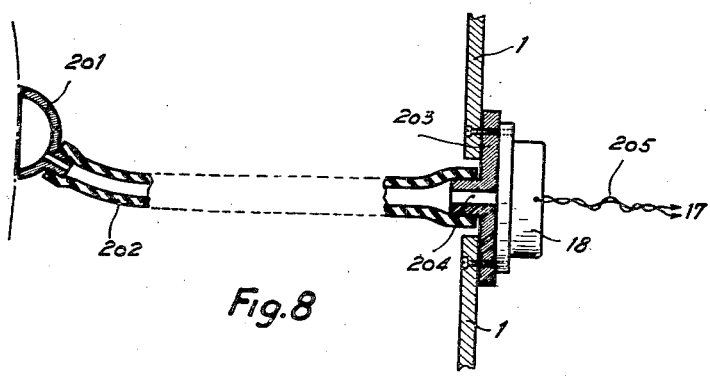
Fig. 8 is a partial diagram showing a particular assembly of the means for detecting the audible signal.

Figure 8 shows how, preferably, is realised the picking up of the audible signal from the patient's artery. A stethoscope 201 being placed on this artery, is in communication through a flexible pipe 202 with a disc 203 bored with a central aperture 204 and secured on the casing 1 of the apparatus. The microphone 18, also secured on the disc 203 is preferably of the uni-directional type. It is connected through the conductors 205 with the amplifier 17. The latter is advantageously chosen of the direct current type, with a high sensitivity.

Figure 9:
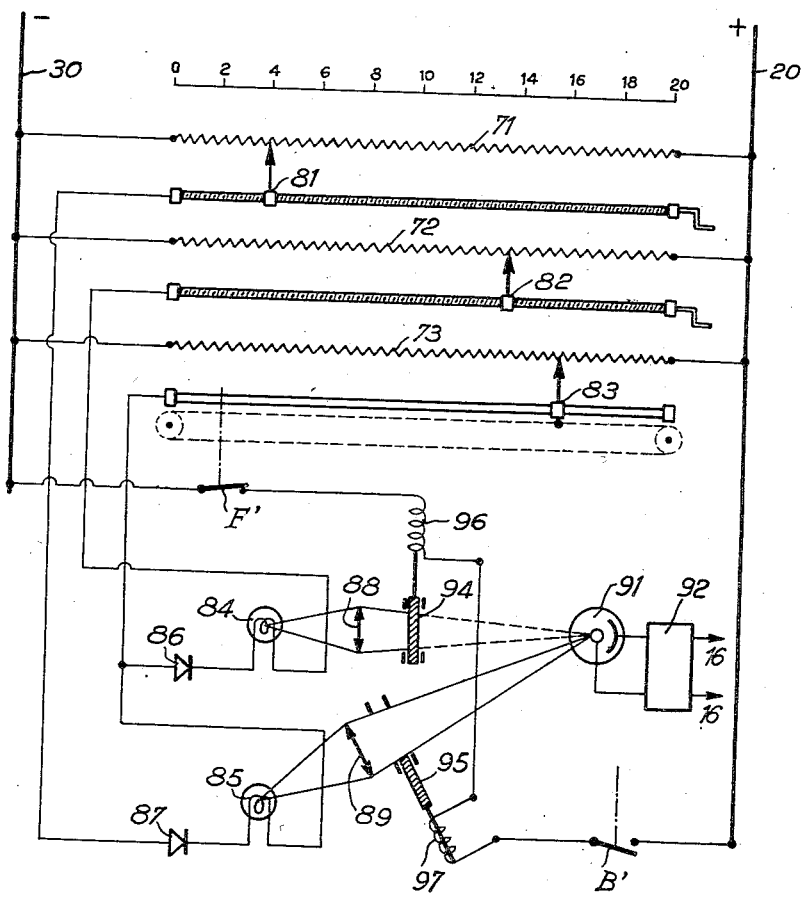
Fig. 9 is a diagrammatic view of another embodiment of the invention the upper part of said view being the same as the part of Fig. 2 above the pressure scale.

In the modified embodiment of Figure 9, the manometric element is combined with a potentiometer and photoelectric relays. There can be seen on this figure, again, the two power supply conductors 20 and 30, between which are connected, in parallel, three identical resistances 71, 72, 73, well calibrated, graduated in values of pressure and provided with slides 81, 82, 83 acting as potentiometers; 81 and 82 are adjustable by hand in position, while 83 is actuated by the manometric element 13.

The slide 83 is connected electrically with the slides 81 and 82 through the medium of two identical circuits mounted in parallel but in opposition. These two circuits comprise respectively the incandescent lamps 85, 84 and the groups of rectifiers 86, 87.

The light beams issuing from the lamps 84 and 85 are sent in convergence by means of lenses 88 and 89 on one and the same photo-electric cell 91 which feeds into an amplifier 92, the whole 91, 92 acting as a relay, connected to the alarm devices such as 16 in Figure 2. On the paths of the light rays from 84 and 85 are arranged, respectively, the sliding shutters 94, normally closed, and 95, normally open, controlled by the electro-magnets 96 and 97, the windings of which are connected in series and power supplied by 20 and 30. The energizing of these electromagnets is under the control of a contact B', normally open, controlled by the above mentioned relay B, and of a contact F', normally closed, controlled by the relay F.

It will be noticed that the potential of the slides is all the higher as the pressures to which they correspond are higher. The operation of this device is then as follows:

After the inflation, the slide 83 moves towards the left. Being on the right of the vertical of 82, it has a higher potential than the latter. The rectifier 86, therefore, passes the current and the lamp 84 is lit. But B' being open, 96 is not energized and 94 stops the light rays from 84. On the contrary current does not flow through 85, owing to the arrangement of 87 and the cell 91 finally receives no light.

When the audible signal occurs, if the pressure is too high, 83 is still on the right of the vertical of 82 and B' closes, which causes the energizing of 96 and the opening of 94. The cell is energized by 84 which releases the alarm.

An inverse operation takes place in case the pressure is too low, the cell 91 being then energized by 85. Finally if the pressure is normal it will be found that none of the lamps 84 and 85 are lit when 83 is located between 82 and 81 and that the shutter 95 is closed when 83 is on the left of 81. The cell, therefore, is not energized.

It is obvious that the invention is not limited to the examples of embodiment described and that any detail modifications could be made thereto. In particular, in one simplified form of embodiment, one could replace the assembly microphone 18, amplifier 17 by a probe, placed over the artery and controlling the energizing of a relay upon the passing of the first pulse.

What is claimed is:

1. A device for automatically checking the arterial pressure, said device comprising in combination a sphygmomanometric armband, inflating means for said armband up to a pressure above the atmospheric pressure, deflating means for said armband, controlling means comprising a periodic contactor for automatically controlling at adjustable intervals of time said inflating and deflating means, a pressure gauge connected to said armband, marking means for at least two reference values of the arterial systolic pressure corresponding to the acceptable limits of said systolic pressure, means to compare the pressure measured by said pressure gauge to said marked values of the limit systolic pressures, detecting means of the audible signal perceived on an artery controlled by said armband, an alarm circuit, control relays for said alarm circuit, said relays being controlled by said comparing means and said detecting means.

2. A device for automatically checking the arterial pressure, said device comprising in combination a sphygmomanometric armband, a source of fluid under pressure, a compression valve disposed between said armband and said source, a decompression valve disposed between said armband and the outside atmosphere, a delayed contactor with automatic repriming for automatically controlling at adjustable intervals of time said compression and decompression valves, a pressure gauge connected to said armband, marking means for at least two reference values of the arterial systolic pressure corresponding to the acceptable limits of said systolic pressure, means to compare the pressure measured by said pressure gauge to said marked values of the limit systolic pressures, detecting means of the audible signal perceived on an artery controlled by said armband, an alarm circuit, control relays for said alarm circuits, said relays being controlled by said comparing means and said detecting means.

3. A device for automatically checking the arterial pressure, said device comprising in combination a sphygmomanometric armband, inflating means for said armband up to a pressure above the atmospheric pressure, deflating means for said armband, controlling means comprising a periodic contactor for automatically controlling at adjustable intervals of time said inflating and deflating means, a pressure gauge with a movable manometric member connected to said armband, a movable contact operated by said movable manometric member, two adjustable contacts and a pressure scale for the adjustment of said contacts, one of said contacts corresponding to the maximum acceptable systolic pressure, and the other one to the minimum necessary systolic pressure, electrical means for comparing the position of said movable contact to that of said adjustable contacts, detecting means of the audible signal perceived on an artery controlled by said armband, an alarm circuit, relays for controlling said alarm circuit, said relays being controlled by said comparing means and said detecting means.

4. An apparatus for automatically checking the arterial pressure, said apparatus comprising in combination a sphygmomanometric armband, inflating means for said armband up to a pressure above the atmospheric pressure, deflating means for said armband, controlling means comprising a periodic contactor for automatically controlling at adjustable intervals of time said inflating and deflating means, a pressure gauge with a movable manometric member connected to said armband, a contact movable on a track and operated by said member, adjustable contacts corresponding to various pressures fitted on said track, relays connected to these adjustable contacts, these relays comprising a priming relay corresponding to the maximum inflating pressure and controlling said inflating and deflating means, a relay corresponding to the maximum acceptable systolic pressure, a relay corresponding to the minimum necessary systolic pressure, alarm relays selectively controlled by said maximum and minimum relays, alarm means controlled by said alarm relays, a depriming relay corresponding to the low residual pressure and controlling said priming relay, detecting means of the audible signal perceived on an artery controlled by said armband, an audible signal relay controlled by said armband, said relay controlling said alarm relays in combination with said maximum and minimum relays.

5. An apparatus for automatically checking the arterial pressure, said apparatus comprising in combination a sphygmomanometric armband, inflating means for said armband up to a pressure above the atmospheric pressure, deflating means for said armband, controlling means comprising a periodic contactor for automatically controlling at adjustable intervals of time said inflating and deflating means, a pressure gauge with a movable manometric member connected to said armband, a slidable contact fitted to said movable manometric member, an insulating track with a pressure scale for said slidable contact, adjustable contacts on said track respectively corresponding to the maximum inflating pressure for the armband, to the maximum acceptable systolic pressure, to the minimum necessary systolic pressure, and to a low residual pressure, a source of tension having two poles, means to connect said slidable contact to one of said poles, pressure relays connected on the one hand to said adjustable contacts and on the other hand to the other one of said poles, detecting means of the audible signal perceived on an artery controlled by said armband, an audible signal relay controlled by said detecting means, an alarm circuit, control relays for said circuit, an energizing circuit for said control relays, and contacts controlled by said pressure relays and said audible signal relay disposed in said energizing circuit for controlling the same.

6. A device according to claim 1 and comprising a device for indicating the duration of the audible arterial signals, said device comprising a relay having a delay longer than the interval between two arterial signals and signalling means, such as a light signal, controlled by said relay.

7. A device according to claim 1 and comprising means for momentarily switching off the alarm circuit for values of the pressure in the armband comprised between the maximum inflating pressure down to a lower value at which all disturbing influences have stopped.

8. A device for automatically checking the arterial pressure, said device comprising in combination a sphygmomanometric armband, inflating means for said armband up to a pressure above the atmospheric pressure, deflating means for said armband, controlling means comprising a periodic contactor for automatically controlling at adjustable intervals of time said inflating and deflating means, a pressure gauge connected to said armband, marking means for at least two reference values of the arterial systolic pressure corresponding to the acceptable limits of said systolic pressure, means to compare the pressure measured by said pressure gauge to said marked values of the limit systolic pressures, detecting means of the audible signal perceived on an artery controlled by said armband, an alarm circuit, control relays for said alarm circuit, said relays being controlled by said comparing means and said detecting means, said device comprising also means for ensuring a temporary accelerated supervision of the arterial pressure if the systolic pressure measured is inside said acceptable limits, but outside security limits corresponding to a smaller range of systolic pressures, said means comprising an auxiliary timing device with a time constant shorter than the time constant of said periodic contactor, means to compare said systolic pressure to said security limits and means energized by said comparing means, to substitute said auxiliary timing device to said periodic contactor.

9. A device for automatically checking the arterial pressure, said device comprising in combination a sphygmomanometric armband, inflating means for said armband up to a pressure above the atmospheric pressure, deflating means for said armband, controlling means comprising a periodic contactor for automatically controlling at adjustable intervals of time said inflating and deflating means, a mercury column manometer connected to said armband, regularly spaced contacts provided in said column for marking at least two reference values of the arterial systolic pressure corresponding to the acceptable limits of said pressure, means to compare the pressure measured by said manometer to said marked values of the limit systolic pressures, detecting means of the audible signal perceived on an artery controlled by said armband, an alarm circuit, control relays for said alarm circuit, said relays being controlled by said comparing means and said detecting means.

10. A device according to claim 1 and comprising means for actuating an alarm if no audible signal has been detected during the decompression of the armband.

11. A device for automatically checking the arterial pressure, said device comprising in combination a sphygmomanometric armband, inflating means for said armband up to a pressure above the atmospheric pressure, deflating means for said armband, controlling means comprising a periodic contactor for automatically controlling at adjustable intervals of time said inflating and deflating means, a pressure gauge with a movable manometric member connected to said armband, a movable contact operated by said member, an insulating track with regularly spaced fixed contacts for said movable contact, multichannel adjustable switches having terminals connected to said fixed contacts, one of said switches allowing to mark the maximum acceptable systolic pressure and the other one the minimum necessary systolic pressure, relays connected to said switches, these relays comprising a priming relay corresponding to the maximum inflating pressure and controlling said inflating and deflating means, a relay corresponding to the maximum acceptable systolic pressure, a relay corresponding to the minimum necessary systolic pressure, alarm relays selectively controlled by said maximum and minimum relays, alarm means controlled by said alarm relays, a depriming relay corresponding to the low residual pressure and controlling said priming relay, detecting means of the audible signal perceived on an artery controlled by said armband, an audible signal relay controlled by said armband, said relay controlling said alarm relays in combination with said maximum and minimum relays.

12. A device for automatically checking the arterial pressure, said device comprising in combination a sphygmomanometric armband, inflating means for said armband up to a pressure above the atmospheric pressure, deflating means for said armband, controlling means comprising a periodic contactor for automatically controlling at adjustable intervals of time said inflating and deflating means, a pressure gauge connected to said armband marking means for at least two reference values of the arterial systolic pressure corresponding to the acceptable limits of said systolic pressure, means to transform into electric potentials the values of the pressure measured in the armband and of said marked limit pressures, means to compare these potentials, detecting means of the audible signal perceived on an artery controlled by said armband, an alarm circuit, control relays for said alarm circuit, said relays being controlled by said comparing means and said detecting means.

13. An apparatus for automatically checking the arterial pressure and comprising in combination a sphygmomanometric armband, inflating means for said armband up to a pressure above the atmospheric pressure, deflating means for said armband, controlling means comprising a periodic contactor for automatically controlling at adjustable intervals of time said inflating and deflating means, a pressure gauge with a movable manometric member connected to said armband, a measuring potentiometer with a slidable contact operated by said movable manometric member, two reference potentiometers with adjustable contacts and a pressure scale for adjustment of said contacts, one of said contacts corresponding to the maximum acceptable systolic pressure and the other one to the minimum necessary systolic pressure, means to energize said potentiometers, two parallelly fitting circuits, comprising rectifiers and lamps, connected to the contacts of the measuring potentiometer and to the contact of one reference potentiometer, detecting means of the audible signal perceived on an artery controlled by said armband, an alarm circuit, a photoelectric relay sensitive to the light of said lamps controlling said alarm circuit, an audible signal relay controlled by said detecting means, and a light control device interposed between said lamps and said photoelectric relay, said device being controlled by said audible signal relay.

References Cited in the file of this patent

UNITED STATES PATENTS

| | | |
|---|---|---|
| 2,193,945 | Strauss et al. | Mar. 19, 1940 |
| 2,352,875 | Williams et al. | July 4, 1944 |
| 2,354,818 | Lippitt | Aug. 1, 1944 |
| 2,379,573 | Gilson | July 3, 1945 |
| 2,699,465 | Hamilton | Jan. 11, 1955 |

FOREIGN PATENTS

| | | |
|---|---|---|
| 458,884 | Canada | Aug. 9, 1949 |